United States Patent
Kanzaki

(10) Patent No.: US 11,016,275 B2
(45) Date of Patent: May 25, 2021

(54) WIDE-ANGLE LENS

(71) Applicant: NIDEC SANKYO CORPORATION, Nagano (JP)

(72) Inventor: Yosuke Kanzaki, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 132 days.

(21) Appl. No.: 16/278,191

(22) Filed: Feb. 18, 2019

(65) Prior Publication Data

US 2019/0258035 A1    Aug. 22, 2019

(30) Foreign Application Priority Data

Feb. 19, 2018  (JP) .............................. JP2018-027006

(51) Int. Cl.
| | | |
|---|---|---|
| *G02B 13/00* | (2006.01) | |
| *G02B 13/04* | (2006.01) | |
| *G02B 9/60* | (2006.01) | |
| G02B 13/06 | (2006.01) | |
| G02B 13/18 | (2006.01) | |
| G02B 5/00 | (2006.01) | |

(52) U.S. Cl.
CPC .............. *G02B 13/04* (2013.01); *G02B 9/60* (2013.01); G02B 5/005 (2013.01); G02B 13/0045 (2013.01); G02B 13/06 (2013.01); G02B 13/18 (2013.01)

(58) Field of Classification Search
CPC ...... G02B 13/0045; G02B 9/60; G02B 13/18; G02B 5/005; G02B 13/04; G02B 13/06
USPC .................. 359/714, 740, 753, 770
See application file for complete search history.

(56) References Cited

U.S. PATENT DOCUMENTS

| | | | |
|---|---|---|---|
| 9,030,764 B2 * | 5/2015 | Asami ................ | G02B 13/0045 359/752 |
| 9,170,404 B2 | 10/2015 | Asami et al. | |
| 9,176,304 B2 | 11/2015 | Asami et al. | |
| 9,182,571 B2 | 11/2015 | Mori et al. | |
| 9,261,674 B2 | 2/2016 | Mori et al. | |

(Continued)

FOREIGN PATENT DOCUMENTS

| | | |
|---|---|---|
| CN | 203838397 | 9/2014 |
| CN | 203894464 | 10/2014 |
| CN | 105204140 | 12/2015 |

(Continued)

OTHER PUBLICATIONS

"Office Action of China Counterpart Application", dated Jan. 4, 2021, with English translation thereof, p. 1-p. 16.

*Primary Examiner* — Evelyn A Lester
(74) *Attorney, Agent, or Firm* — JCIPRNET

(57) ABSTRACT

A wide-angle lens 100 includes a first lens 10, a second lens 20, a third lens 30, a diaphragm 72, a fourth lens 40, and a fifth lens 50. The first lens 10 is a negative meniscus lens whose lens surface on an image side Lb is a concave curved surface. The second lens 20 is a negative lens whose lens surface on the image side Lb is a concave curved surface and whose lens surface on the object side La is convex curved surface. The third lens 30 is a positive lens whose lens surface on the image side Lb is a convex curved surface. The fourth lens 40 is a negative lens whose lens surface on the image side Lb is a concave curved surface. The fifth lens 50 is a biconvex lens. A refractive index n1 of the first lens 10 satisfies a conditional expression.

11 Claims, 12 Drawing Sheets

(56) References Cited

U.S. PATENT DOCUMENTS 9,274,313 B2     3/2016   Mori et al.

FOREIGN PATENT DOCUMENTS

| | | |
|---|---|---|
| CN | 206387952 | 8/2017 |
| CN | 107272163 | 10/2017 |
| CN | 107305276 | 10/2017 |
| EP | 3226053 | 10/2017 |
| JP | 2009063877 | 3/2009 |
| JP | 201545803 | 3/2015 |
| NO | 2015040808 | 3/2015 |

* cited by examiner

WIDE-ANGLE LENS

CROSS-REFERENCE TO RELATED APPLICATION

This application claims the priority benefits of Japan Patent Application No. 2018-027006, filed on Feb. 19, 2018. The entirety of each of the above-mentioned patent applications is hereby incorporated by reference herein and made a part of this specification.

BACKGROUND

Field of the Invention

The present invention relates to a wide-angle lens employed for various types of image pickup systems.

Description of the Related Documents

For a wide-angle lens, a lens configuration of five lenses in four groups has been proposed (see Japanese Unexamined Patent Application Publication No. 2009-63877 (hereinafter, referred to as PTL 1) and Japanese Unexamined Patent Application Publication No. 2015-45803 (hereinafter, referred to as PTL 2)). The wide-angle lenses in PTLs 1 and 2 are composed of a first lens, a second lens, a third lens, a diaphragm, a fourth lens, and a fifth lens arranged in order from an object side, and the first lens is a negative lens whose lens surface on an image side is a concave curved surface, the second lens is a negative lens whose lens surface on an image side is a concave curved surface, the third lens is a positive lens whose lens surface on an image side is a convex curved surface, and the fourth lens is a negative lens whose lens surface on an image side is a concave curved surface. The fifth lens is a biconvex lens in which both a lens surface on an object side and a lens surface on an image side are convex curved surfaces, and configures a cemented lens with the fourth lens.

PTL 1: Japanese Unexamined Patent Application Publication No. 2009-63877
PTL 2: Japanese Unexamined Patent Application Publication No. 2015-45803

SUMMARY

In recent years, demands for miniaturization, low price, and high resolution are increasing in the lens unit market. In the wide-angle lens, the lens surface on an image side of the first lens tends to become a deeper concave surface as the angle of view increases. That is, if the lens surface of the first lens on the image side becomes a deep concave curved surface, lens molding becomes difficult. That is, it is difficult to prevent a cost increase. Further, when the lens surface of the first lens on the image side becomes a deep concave curved surface, there is a concern about an occurrence of a ring-shaped ghost caused by multiple reflection between the lens surface of the first lens on the image side and the lens surface of the second lens on the object side.

In the lens configurations described in PTLs 1 and 2, in order to further widen the angle, design limitations on the second lens and the third lens located closer to the object side than the diaphragm become excessively large, there is a problem that productivity of the second lens and an object-to-image distance of an entire lens system are sacrificed, and therefore, there has been a demand to seek another technology.

In view of the above problems, the present invention provides a wide-angle lens capable of widening an angle, with a lens configuration of five lenses in four groups while maintaining productivity of a second lens and shortening an object-to-image distance in an entire lens system.

A wide-angle lens according to the present invention includes a first lens, a second lens, a third lens, a diaphragm, a fourth lens, and a fifth lens arranged in order from an object side, wherein the first lens is a negative meniscus lens whose lens surface on an image side is a concave curved surface, the second lens is a negative lens whose lens surface on the image side is a concave curved surface and whose lens surface on the object side is convex curved surface, the third lens is a positive lens whose lens surface on the image side is a convex curved surface, the fourth lens is a negative lens whose lens surface on the image side is a concave curved surface, the fifth lens is a biconvex lens whose lens surface on the image side and lens surface on the object side are convex curved surfaces, the second lens, the third lens, the fourth lens, and the fifth lens are plastic lenses, and a refractive index $n1$ of the first lens satisfies the following conditional expression (1), where $n1$ denotes a refractive index Nd of the first lens.

$$1.7 < n1 \quad \text{Conditional expression (1)}$$

Since the refractive index $n1$ of the first lens exceeds 1.7 (, in which the first lens has a high refractive index), an outer diameter of the first lens can be decreased in size. Therefore, it is possible to reduce a size of the wide-angle lens. In addition, since the refractive index $n1$ of the first lens exceeds 1.7 (, in which the first lens has a high refractive index), a sag quantity of the lens surface of the first lens on the image side can be reduced (shallow), and thus, molding becomes easy. Further, since the refractive index $n1$ of the first lens exceeds 1.7 (, in which the first lens has a high refractive index), an sag quantity of the lens surface of the second lens on the object side can be reduced (shallow), and it is possible to suppress multiple reflection between the lens surface of the first lens on the image side and the lens surface of the second lens on the object side. Therefore, occurrence of a ring-shaped ghost caused by the multiple reflection between the lens surface of the first lens on the image side and the lens surface of the second lens on the object side can be suppressed.

When the sag quantity of the lens surface of the second lens on the object side is Sag21 (mm) and a diameter of the lens surface of the second lens on the object side is D21 (mm), the sag quantity Sag21 and the diameter D21 may satisfy the following conditional expression (2).

$$0 < |Sag21/(D21/2)| < 0.125 \quad \text{Conditional expression (2)}$$

Since a value of |Sag21/(D21/2)| exceeds 0, a first surface (lens surface of an object side La) of the second lens does not become a flat surface. Therefore, various types of aberrations can be appropriately corrected. Further, since the value of |Sag21/(D21/2)| is less than 0.125, the sag quantity of the first surface (lens surface on the object side La) of the second lens does not become too large (deep), and it is possible to suppress a ghost (ring-shaped ghost) generated by reflection of a second surface (lens surface on an image side Lb) of the first lens and the first surface (lens surface on the object side La) of the second lens.

When the sag quantity of the lens surface of the first lens on the image side is Sag12 (mm) and the diameter of the lens surface of the first lens on the image side is D12 (mm), the sag quantity Sag12 and the diameter D12 may satisfy the following conditional expression (3).

$$0.050 < Sag12/(D12/2) < 1.733 \quad \text{Conditional expression (3)}$$

Since the value of Sag12/(D12/2) exceeds 0.050, it is possible to prevent a case where the sag quantity of the second surface (lens surface on the image side Lb) of the first lens becomes too small (shallow) to weaken a negative power, and various types of aberrations can be properly corrected. In addition, since the value of Sag12/(D12/2) is less than 1.733, the sag quantity of the second surface (lens surface on the image side Lb) of the first lens is not too large (deep), and the lens can be easily manufactured. Therefore, the cost of the first lens can be reduced.

When a composite focal length of the first lens and the second lens is f12 (mm) and a composite focal length of the entire lens system is f0 (mm), the following conditional expression (4) may be satisfied.

$$-2.5 < f12/f0 < -0.5 \quad \text{Conditional expression (4)}$$

Since f12/f0 is closer to 0 than −2.5, a curvature of the image surface can be suppressed. Further, by setting f12/f0 to less than −0.5, a viewing angle can be increased.

When the composite focal length of the first lens and the second lens is f12 (mm) and the composite focal length of the third lens, the fourth lens, and the fifth lens is f345 (mm), the composite focal lengths f12 and f345 may satisfy the following conditional expression (5).

$$0.1 < |f12/f345| < 1 \quad \text{Conditional expression (5)}$$

Since the value of |f12/f345| is less than 1, it is possible to suppress an excessive increase in the positive power, and thus, a coma aberration and an astigmatism can be properly corrected. In addition, since the value of |f12/f345| exceeds 0.1, it is possible to suppress an excessive increase in the negative power, and thus, it is possible to avoid a total length of the entire lens system from becoming too long.

When the composite focal length of the first lens, the second lens, and the third lens is f123 (mm) and the composite focal length of the fourth lens and the fifth lens is f45 (mm), the composite focal lengths f123 and f45 may satisfy the following conditional expression (6).

$$0.1 < f123/f45 < 1.1 \quad \text{Conditional expression (6)}$$

Since the value of f123/f45 is less than 1, it is possible to suppress an excessive increase in the positive power, and thus, a coma aberration and an astigmatism can be appropriately corrected. Further, since the value of f123/f45 exceeds 0.1, it is possible to suppress an excessive increase in the negative power, and thus, it is possible to avoid a total length of the entire lens system from becoming too long.

The first lens may be a glass lens.

The wide-angle lens according to the present invention is capable of widening an angle, with a lens configuration of five lenses in four groups while maintaining productivity of a second lens and shortening an object-to-image distance in an entire lens system.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A first embodiment, a second embodiment, and a third embodiment will be described for a wide-angle lens 100 to which the present invention is applied.

First Embodiment

Overall Configuration

Figure 1:
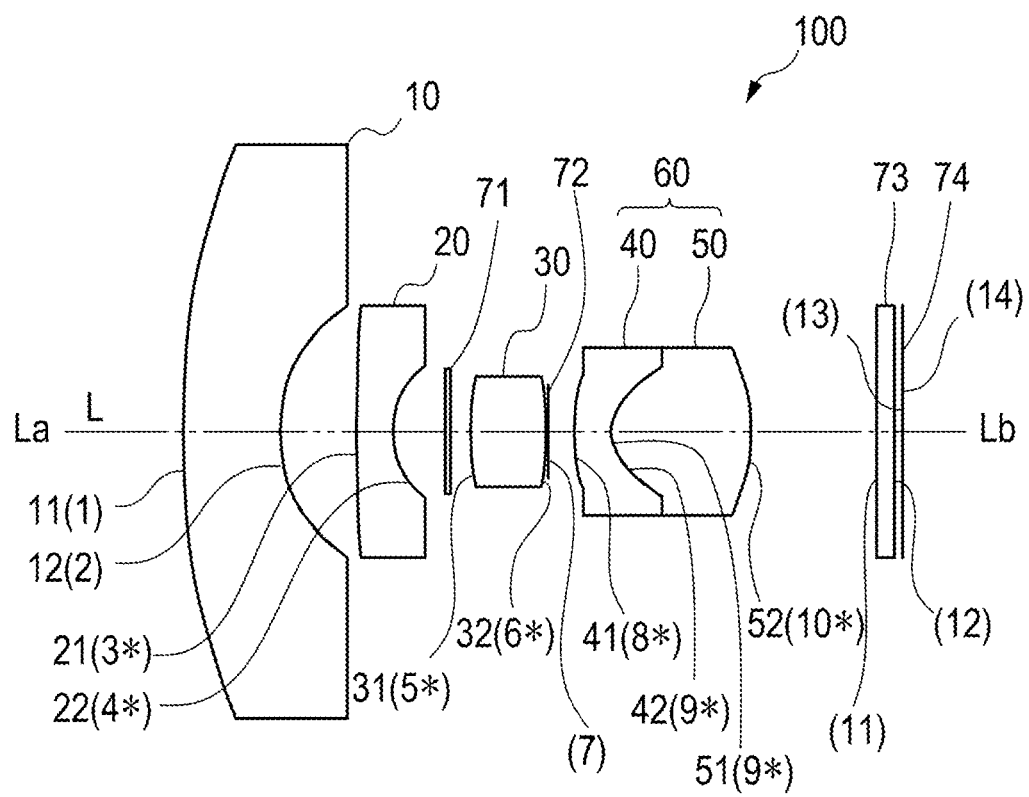
FIG. 1 is an explanatory diagram of a wide-angle lens according to a first embodiment.
Figure 2:
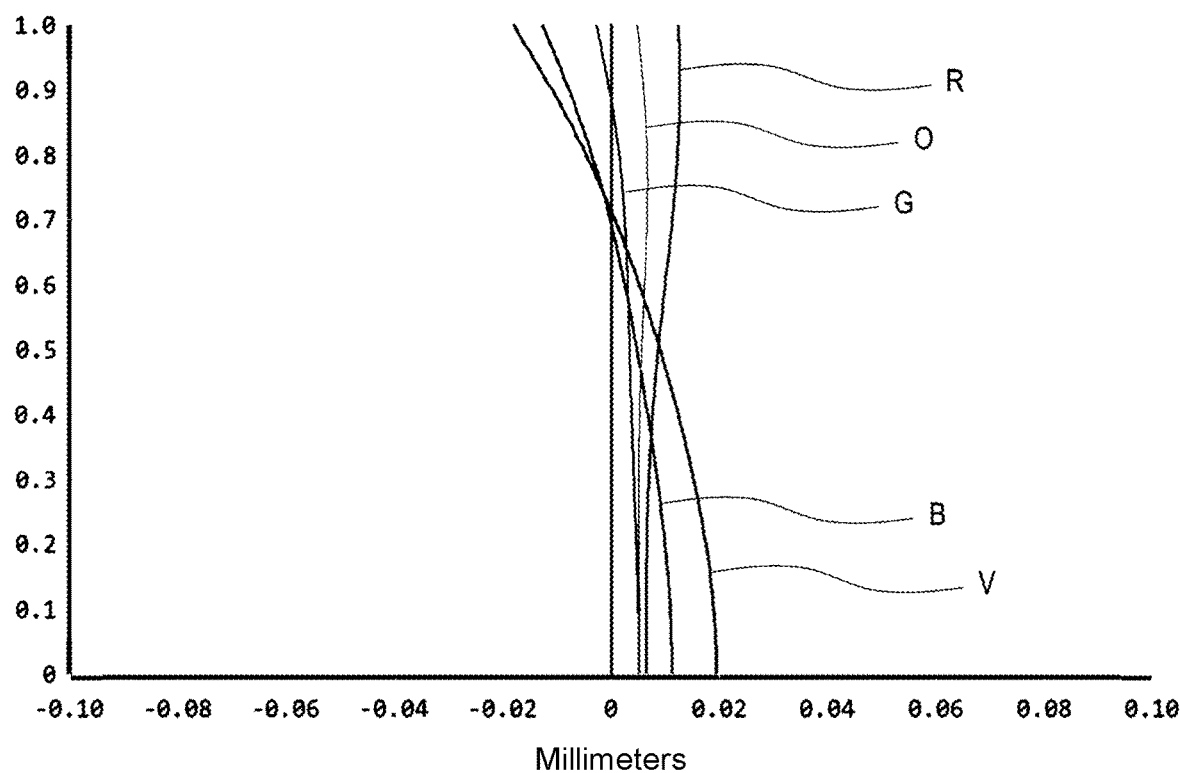
FIG. 2 is a graph explaining a spherical aberration of the wide-angle lens illustrated in FIG. 1.
Figure 3:
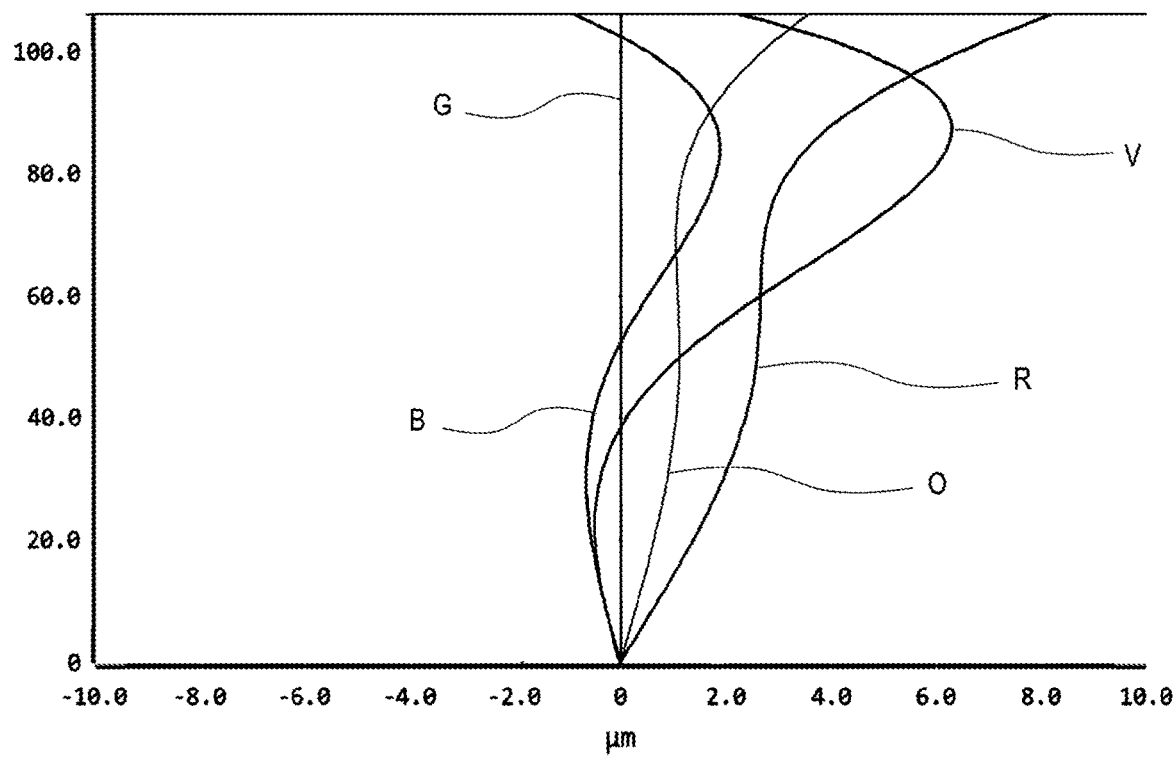
FIG. 3 is a graph explaining a magnification chromatic aberration of the wide-angle lens illustrated in FIG. 1.
Figure 4:
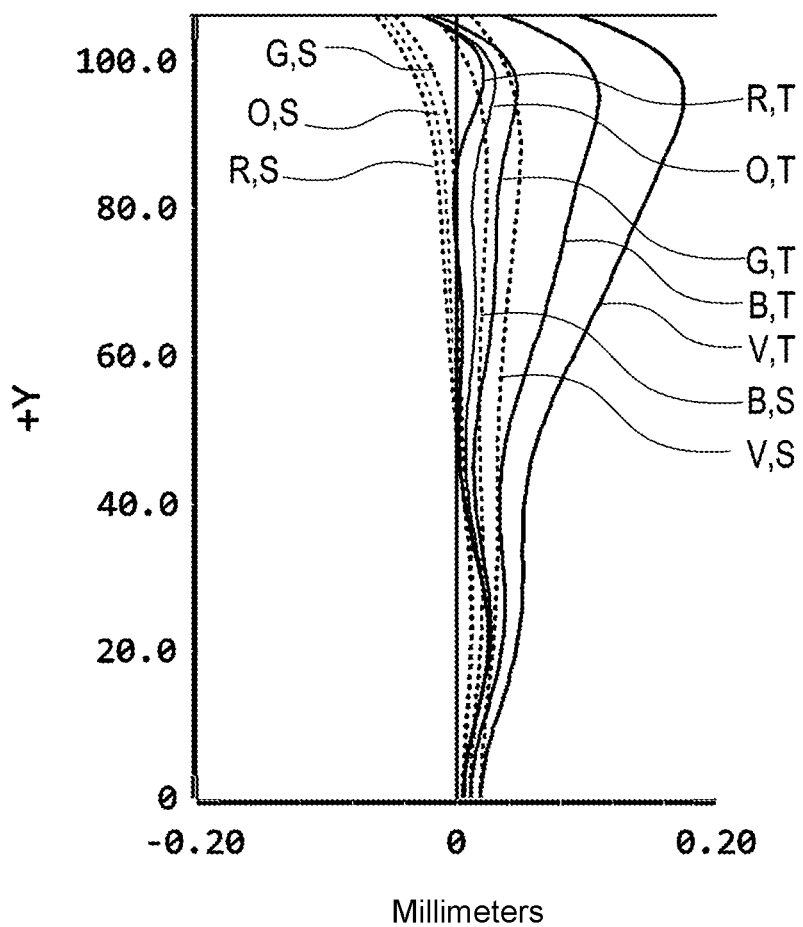
FIG. 4 is a graph explaining an astigmatism of the wide-angle lens illustrated in FIG. 1.
Figure 5:
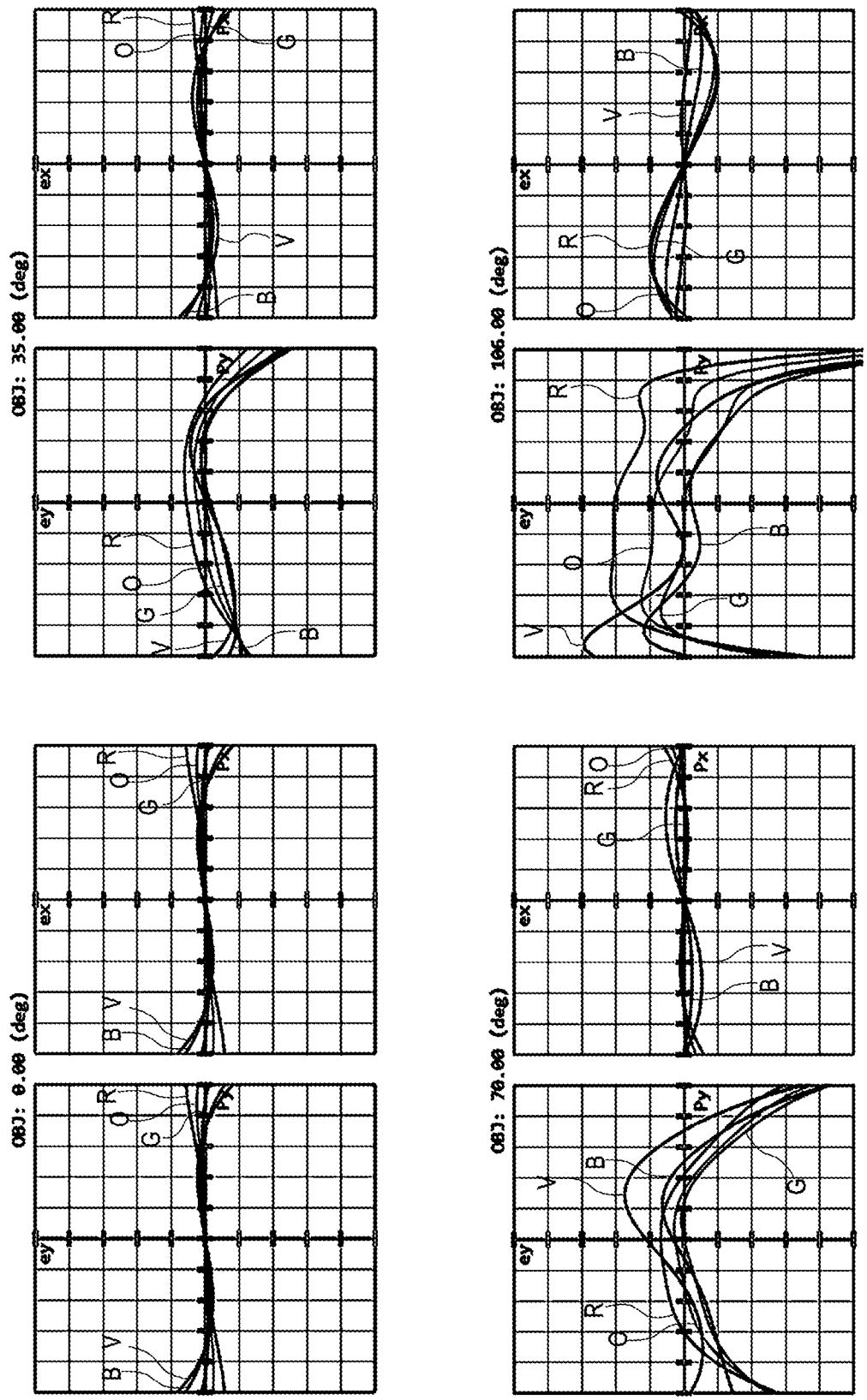
FIG. 5 is a graph explaining a lateral aberration of the wide-angle lens illustrated in FIG. 1.

FIG. 1 is an explanatory diagram of the wide-angle lens 100 according to the first embodiment of the present invention. FIG. 2 is a graph explaining a spherical aberration of the wide-angle lens 100 illustrated in FIG. 1. FIG. 3 is a graph explaining a magnification chromatic aberration of the wide-angle lens 100 illustrated in FIG. 1, where the magnification chromatic aberration at a maximum angle of view (half angle of view) is illustrated. FIG. 4 is a graph explaining an astigmatism of the wide-angle lens 100 illustrated in FIG. 1. FIG. 5 is a graph explaining a lateral aberration of the wide-angle lens 100 illustrated in FIG. 1. In FIG. 1, surface numbers are denoted in parentheses, and aspheric surfaces are marked with *.

It is noted that FIG. 2, FIG. 3, and FIG. 5 illustrate each aberration in red light R (wavelength 668 nm), orange light O (600 nm), green light G (wavelength 546 nm), and blue light B (wavelength 473 nm), and purple light V (435 nm). Further, with respect to the astigmatism illustrated in FIG. 4, S indicates a characteristic in a sagittal direction and T indicates a characteristic in a tangential direction. In FIG. 5, lateral aberrations of two directions (y direction and x direction) perpendicular to an optical axis at each angle of 0.00 deg, 35.00 deg, 70.00 deg, and 106.00 deg of the red light R, the orange light O, the green light G, the blue light B, and the purple light V are illustrated collectively.

As illustrated in FIG. 1, the wide-angle lens 100 of the present embodiment includes a first lens 10, a second lens 20, a light shielding sheet 71, a third lens 30, a diaphragm 72, a fourth lens 40, and a fifth lens 50, arranged in order from an object side La to an image side Lb, and a flat plate-shaped infrared filter 73, a translucent cover 74, and an image pickup element (not illustrated) are arranged in order on the image side Lb with respect to the fifth lens 50. In the present embodiment, a projection method of the wide-angle lens 100 is a stereographic projection method where a peripheral image is larger than a central image.

A configuration and the like of each lens of the wide-angle lens 100 of the present embodiment are as shown in Table 1, and in Table 1, the following characteristics are listed as characteristics of the wide-angle lens 100.

Focal length f0 (Effective Focal Length) of the entire lens system

Object-to-image distance (Total Track)

F value (Image Space) of the entire lens system

Maximum field angle (Max. Field Angle)

Horizontal field angle (Horizontal Field Angle)

Further, in Table 1, the following items of each surface (Surf) are listed.

Radius of curvature (Radius)

Thickness

Refractive index Nd

Abbe number νd

Effective radius of lens surface (Semi-Diameter)

Sag quantity Sag

Focal length f

Composite focal length fd1, fd2

It is noted that the radius of curvature, the thickness, the focal length, and the effective radius are all mentioned in mm. Here, if the lens surface is a convex surface protruding toward the object side La or a concave surface recessed toward the object side La, the curvature radius is set to a positive value, and if the lens surface is a convex surface protruding toward the image side Lb or a concave surface recessed toward the image side Lb, the curvature radius is set to a negative value. Further, the focal length of a positive lens (a lens having a positive power) is a positive value, and the focal length of a negative lens (a lens having a negative power) is a negative value.

TABLE 1

| | | | | | |
|---|---|---|---|---|---|
| | Effective Focal Length(f0) | | 1.334 | | mm |
| | Total Track | | 12.454 | | mm |
| | Image Space F/# | | 2.8 | | |
| | Max. Field of Angle | | 212 | | deg |
| | Horizontal Field of Angle | | 153.200 | | deg |

| | Surf | Radius | Thickness | Nd | ν d | Semi-Diameter | Sag | f | fd1 | fd2 |
|---|---|---|---|---|---|---|---|---|---|---|
| 1 | 1 | 13.870 | 1.690 | 1.808 | 46.26 | 4.965 | 0.224 | −4.243 | −1.414 | 4.118 |
| | 2 | 2.600 | 1.351 | | | 2.190 | 0.242 | | | |
| 2 | 3* | 30.436 | 0.600 | 1.546 | 56.19 | 2.190 | 0.009 | −2.886 | | |
| | 4* | 1.489 | 1.364 | | | 1.149 | 0.114 | | | |
| 3 | 5* | 7.711 | 1.350 | 1.641 | 23.90 | 0.957 | 0.015 | 2.930 | 2.635 | |
| | 6* | −2.314 | −0.060 | | | 0.679 | −0.025 | | | |
| | 7(stop) | Infinity | 0.544 | | | | | | | |
| 4, 5 | 8* | 3.981 | 0.600 | 1.641 | 23.90 | 0.960 | 0.030 | −1.357 | | 4.320 |
| | 9* | 0.672 | 2.442 | 1.546 | 56.19 | 1.149 | 0.237 | 1.336 | | |
| | 10* | −2.409 | 0.100 | | | 1.458 | −0.105 | | | |
| | 11 | Infinity | 2.103 | | | | | | | |
| | 12 | Infinity | 0.300 | | | | | | | |
| | 13 | Infinity | 0.070 | | | | | | | |
| | 14 | Infinity | 0.000 | | | | | | | |

Table 2 shows aspheric coefficients A4, A6, A8, A10, A12, A14, and A16 obtained when a shape of an aspheric lens used for the wide-angle lens 100 is represented by the following expression (Math. 1). In the following expression, z donates a sag quantity (axis in an optical axis direction), r denotes a height (rays height) in a direction perpendicular to the optical axis, K denotes a conical coefficient, and c denotes a reciprocal of the radius of curvature.

TABLE 2

| Surf | c (1/Radius) | K | A4 | A6 | A8 |
|---|---|---|---|---|---|
| 3 | 3.28555E−02 | 0.00000E+00 | −1.45967E−02 | 7.06897E−03 | −1.07876E−03 |
| 4 | 6.71788E−01 | 4.33625E−01 | −3.03709E−02 | −1.71860E−02 | 4.18548E−02 |
| 5 | 1.29684E−01 | 0.00000E+00 | 2.92709E−03 | 9.72776E−03 | 1.16432E−02 |
| 6 | −4.32191E−01 | 0.00000E+00 | 3.80020E−02 | −4.02546E−04 | −1.24433E−03 |
| 8 | 2.51223E−01 | 0.00000E+00 | 1.33446E−02 | −4.87518E−03 | 6.15086E−03 |
| 9 | 1.48809E+00 | −1.24366E+00 | 1.74486E−02 | −1.25172E−02 | 2.35845E−02 |
| 10 | −4.15118E−01 | −9.69013E+00 | −5.58048E−02 | 3.73950E−02 | −1.45339E−02 |

| Surf | A10 | A12 | A14 | A16 |
|---|---|---|---|---|
| 3 | 4.40815E−05 | 9.02269E−07 | 0.00000E+00 | 0.00000E+00 |
| 4 | −2.79777E−02 | 9.56224E−03 | 0.00000E+00 | 0.00000E+00 |
| 5 | −1.64470E−03 | 4.90669E−04 | 0.00000E+00 | 0.00000E+00 |
| 6 | 9.51496E−03 | −7.79475E−04 | 0.00000E+00 | 0.00000E+00 |
| 8 | −1.01922E−03 | −4.39827E−04 | 0.00000E+00 | 0.00000E+00 |
| 9 | −1.25024E−03 | −2.34568E−03 | 0.00000E+00 | 0.00000E+00 |
| 10 | 3.78028E−03 | −2.93144E−04 | 0.00000E+00 | 0.00000E+00 |

$$Z = \frac{cr^2}{1 + \sqrt{1 - (1+K)c^2 r^2}} + \sum_{n=2}^{5} A_{2n} r^{2n} \qquad \text{[Math. 1]}$$

As shown in Table 1, in the wide-angle lens 100 of the present embodiment, a focal length f0 of the entire lens system is 1.334 mm, an object-to-image distance is 12.454 mm, an F value of the entire lens system is 2.8, a maximum field angle is 212 deg, and a horizontal field angle is 153.200 deg.

The first lens 10 is a negative lens whose lens surface 12 (second surface (2)) on the image side Lb is a concave curved surface. In the present embodiment, a lens surface 11 (first surface (1)) of the first lens 10 on the object side La is a convex curved surface, and the first lens 10 is a negative meniscus lens. The first lens 10 is a glass lens, and the lens surface 11 (first surface (1)) and the lens surface 12 (second surface (2)) are spherical. For the first lens 10, a lens material having a refractive index of 1.808 and an Abbe number of 46.26 is employed, and the focal length is −4.243 mm.

The second lens 20 is a negative lens whose lens surface 21 (third surface (3)) of the second lens 20 on the object side La is a convex curved surface and whose lens surface 22 (fourth surface (4)) on the image side Lb is a concave curved surface. The second lens 20 is a plastic lens made of acrylic resins, polycarbonates, polyolefins or the like, and both the lens surface 21 (third surface (3)) and the lens surface 22 (fourth surface (4)) are aspherical. For the second lens 20, a lens material having a refractive index of 1.546 and an Abbe number of 56.19 is employed, and the focal length is −2.886 mm.

The third lens 30 is a positive lens whose lens surface 32 (sixth surface (6)) on the image side Lb is a convex curved surface. In the present embodiment, a lens surface 31 (fifth surface (5)) of the third lens 30 on the object side La is a convex curved surface, and the third lens 30 is a biconvex lens. The third lens 30 is a plastic lens made of acrylic resins, polycarbonates, polyolefins or the like, and the lens surface 31 (fifth surface (5)) and the lens surface 32 (sixth surface (6)) are aspherical. For the third lens 30, a lens material having a refractive index of 1.641 and an Abbe number of 23.90 is employed, and the focal length is 2.930 mm.

The fourth lens 40 is a negative lens whose lens surface 42 on the image side Lb is a concave curved surface. In the present embodiment, the lens surface 41 (eighth surface (8)) of the fourth lens 40 on the object side La is a convex curved surface, and the fourth lens 40 is a meniscus lens. The fourth lens 40 is a plastic lens made of acrylic resins, polycarbonates, polyolefins or the like, and the lens surface 41 (eighth surface (8)) and the lens surface 42 (ninth surface (9)) are aspherical. For the fourth lens 40, a lens material having a refractive index of 1.641 and an Abbe number of 23.90 is employed.

The fifth lens 50 is a biconvex lens in which both a lens surface 51 (ninth surface (9)) on the object side La and a lens surface 52 (tenth surface (10)) on the image side Lb are convex curved surfaces. The fifth lens 50 is a plastic lens made of acrylic resins, polycarbonates, polyolefins or the like, and the lens surface 51 (ninth surface (9)) and the lens surface 52 (tenth surface (10)) are aspherical. For the fifth lens 50, a lens material having a refractive index of 1.546 and an Abbe number of 56.19 is employed.

Here, the lens surface 42 of the fourth lens 40 on the image side Lb and the lens surface 51 of the fifth lens 50 on the object side La are formed in the same shape, and the fourth lens 40 and the fifth lens 50 configure a cemented lens 60 in which the lens surface 42 of the fourth lens 40 on the image side Lb and the lens surface 51 of the fifth lens 50 on the object side La are cemented with resin.

Therefore, a cemented surface between the lens surface 42 of the fourth lens 40 on the image side Lb and the lens surface 51 of the fifth lens 50 on the object side La is the ninth surface (9). The focal length (composite focal length f34) of the cemented lens 60 is 4.320 mm. In the present embodiment, a resin material is a UV curing adhesive. Preferably, the adhesive is a material having elasticity even after the curing.

A surface of the infrared filter 73 on the object side La configures an eleventh surface (11), and a surface on the image side Lb configures a twelfth surface (12). A surface of the cover 74 on the object side La configures a thirteenth surface (13). A surface of the cover 74 on the image side Lb configures a fourteenth surface (14), which corresponds to an image pickup surface of the image pickup element.

As illustrated in FIG. 2 to FIG. 5, in the wide-angle lens 100 of the present embodiment, the spherical aberration, the magnification chromatic aberration, the astigmatism, and the lateral aberration are corrected to an appropriate level.

Conditional expression

In the wide-angle lens 100 of the present embodiment, various values related to conditional expressions (1) to (6) described below are provided in Table 3. Since the wide-angle lens 100 of the present embodiment satisfies the following conditional expressions (1) to (6), lens characteristics illustrated in FIG. 3 to FIG. 5 are provided. It is noted that Table 3 also provides respective values of a second embodiment and a third embodiment described later. In addition, the values shown in Table 3 and the values described below are subjected to fractional processing by rounding off.

TABLE 3

| Conditional expression | First embodiment | Second embodiment | Third embodiment |
|---|---|---|---|
| (1) 5 lenses in 4 groups system, each lens configuration & 1.7 < L1 Nd | 1.808 | 1.808 | 1.808 |
| (2) 0 < \| Sag21/(D21/2) \| < 0.125 | 0.004 | 0.005 | 0.014 |
| (3) 0.050 < Sag12/(D12/2) < 1.733 | 0.110 | 0.111 | 0.111 |
| (4) −2.5 < f12/f0 < −0.5 | −1.060 | −1.030 | −1.109 |
| (5) 0.1 < \| f12/f345 \| < 1 | 0.537 | 0.542 | 0.597 |
| (6) 0.1 < f123/f45 < 1.1 | 0.953 | 1.04 | 0.946 |

Conditional Expression (1)

In the wide-angle lens 100 of the present embodiment, when n1 denotes the refractive index Nd of the first lens 10, the refractive index n1 of the first lens 10 satisfies the following conditional expression (1).

$1.7 < n1$  Conditional expression (1)

Specifically, the refractive index n1 of the first lens 10 is 1.808. As in the present embodiment, since the refractive index n1 of the first lens 10 exceeds 1.7, that is, the first lens 10 has a high refractive index, the outer diameter of the first lens 10 can be reduced. Therefore, it is possible to reduce the size of the wide-angle lens 100. In addition, since the refractive index n1 of the first lens 10 exceeds 1.7, the sag quantity of the lens surface 12 on the image side Lb of the first lens 10 can be reduced (shallowed), and thus, molding is facilitated. Further, since the refractive index n1 of the first lens 10 exceeds 1.7, the sag quantity of the lens surface 21 of the second lens 20 on the object side La can be reduced (shallowed), which can suppress the multiple reflection between the lens surface 12 of the first lens 10 on the image side Lb and the lens surface 21 of the second lens 20 on the object side La. Therefore, it is possible to suppress the occurrence of a ring-shaped ghost due to such a multiple reflection.

Conditional Expression (2)

When the sag quantity of the lens surface 21 of the second lens 20 on the object side La is Sag21 (mm) and a diameter of the lens surface 21 of the second lens 20 on the object side La is D21 (mm), the sag quantity Sag21 and the diameter D21 satisfies the following conditional expression (2).

$$0<|Sag21/(D21/2)|<0.125 \quad \text{Conditional expression (2)}$$

It is noted that the diameter (Diameter) of the lens surface is an optical effective diameter on the lens surface. It is noted that the effective diameter is a diameter of a circle comprised of an outermost point in the radial direction (point farthest from the optical axis) when considering a point where all rays contributing to an image formation intersect the lens surface.

Further, the sag quantity is a distance from a point on an optical axis L of an imaginary reference surface to a point on an optical axis L of the lens surface, when an imaginary plane perpendicular to the optical axis is an imaginary plane and an imaginary plane at the effective diameter of the lens surface is an imaginary reference plane. The sag quantity being a negative value means that the point on the optical axis L on the imaginary reference surface is located closer to the object side than the point on the lens surface on the optical axis L.

Specifically, the sag quantity Sag21 is 0.009 and the diameter D21/2 is 2.190, |Sag21/(D21/2)| is 0.004, and exceeds 0 and is less than 0.125. Since |Sag21/(D21/2)| exceeds 0, the first surface of the second lens 20 (that is, the lens surface 21 on the object side La) is not a plane. Therefore, various types of aberrations can be appropriately corrected. Since the value of |Sag21/(D21/2)| is less than 0.125, the sag quantity Sag21 of the first surface (that is, the lens surface 21 on the object side La) of the second lens 20 does not become too large (deep), and as a result, the ghost (ring-shaped ghost) generated by reflection of the second surface of the first lens 10 (that is, the lens surface 12 on the image side Lb) and the first surface of the second lens 20 (that is, the lens surface 21 on the object side La) can be suppressed.

Conditional Expression (3)

When the sag quantity of the lens surface 12 of the first lens 10 on the image side Lb is Sag12 (mm) and the diameter of the lens surface 12 of the first lens 10 on the image side Lb is D12 (mm), the sag quantity Sag12 and diameter D12 satisfy the following conditional expression (3):

$$0.050<Sag12/(D12/2)<1.733 \quad \text{Condition expression (3)}$$

Specifically, Sag12 is 0.242, D12/2 is 2.190, and Sag12/(D12/2) is 0.110. Since the Sag12/(D12/2) exceeds 0.050, it is possible to prevent the sag quantity of the second surface of the first lens from becoming too small (shallow) to weaken the negative power and properly correct various types of aberrations. In addition, since the value of Sag12/(D12/2) is less than 1.733, the sag quantity of the second surface (that is, the lens surface 12 on the image side Lb) of the first lens 10 is not too large (deep), and the lens can be easily manufactured. Therefore, the cost of the first lens 10 can be reduced.

Conditional Expression (4)

When a composite focal length of the first lens 10 and the second lens 20 is f12 (mm) and a composite focal length of the entire lens system is f0 (mm), the following conditional expression (4) is satisfied.

$$-2.5<f12/f0<-0.5 \quad \text{Conditional expression (4)}$$

Specifically, the composite focal length f12 is −1.414, f0 is 1.334, and f12/f0 is −1.060. Since f12/f0 is closer to 0 than −2.5, a curvature of the image surface can be suppressed. Further, by setting f12/f0 to less than −0.5, a viewing angle can be increased.

Conditional Expression (5)

When the composite focal length of the first lens 10 and the second lens 20 is f12 (mm) and the composite focal length of the third lens 30, the fourth lens 40, and the fifth lens is f345 (mm), the composite focal lengths f12 and f345 satisfy the following conditional expression (5).

$$0.1<|f12/f345|<1 \quad \text{Conditional expression (5)}$$

Specifically, the composite focal length f12 is −1.414, the composite focal length f345 is 2.635, and |<f12/f345| is 0.537. Since the value of |<f12/f345| is less than 1, it is possible to suppress an excessive increase in the positive power, and thus, a coma aberration and an astigmatism can be properly corrected. In addition, since the value of |<f12/f345| exceeds 0.1, it is possible to suppress an excessive increase in the negative power, and thus, it is possible to avoid a total length of the entire lens system from becoming too long.

Conditional Expression (6)

When the composite focal length of the first lens 10, the second lens 20, and the third lens 30 is f123 (mm) and the composite focal length f45 of the fourth lens 40 and the fifth lens 50 is f45 (mm), the composite focal lengths f123 and f45 satisfy the following conditional expression (6).

$$0.1<f123/f45<1.1 \quad \text{Conditional expression (6)}$$

Specifically, the composite focal length f123 is 4.118, the composite focal length f45 is 4.320, and f123/f45 is 0.953. Since the value of f123/f45 is less than 1.1, it is possible to suppress an excessive increase in the positive power, and thus, a coma aberration and an astigmatism can be appropriately corrected. Further, since the value of f123/f45 exceeds 0.1, it is possible to suppress an excessive increase in the negative power, and thus, it is possible to avoid a total length of the entire lens system from becoming too long.

In addition, it is more preferable that the composite focal lengths f123 and f45 satisfy the following conditional expression (6-2):

$$0.1<f123/f45<1 \quad \text{Condition expression (6-2)}$$

Even in this case, since f123/f45 is 0.953, the value of f123/f45 is less than 1. Accordingly, it is possible to further suppress an excessive increase in the positive power, so that the coma aberration and the astigmatism can be appropriately corrected.

Second Embodiment

Figure 6:
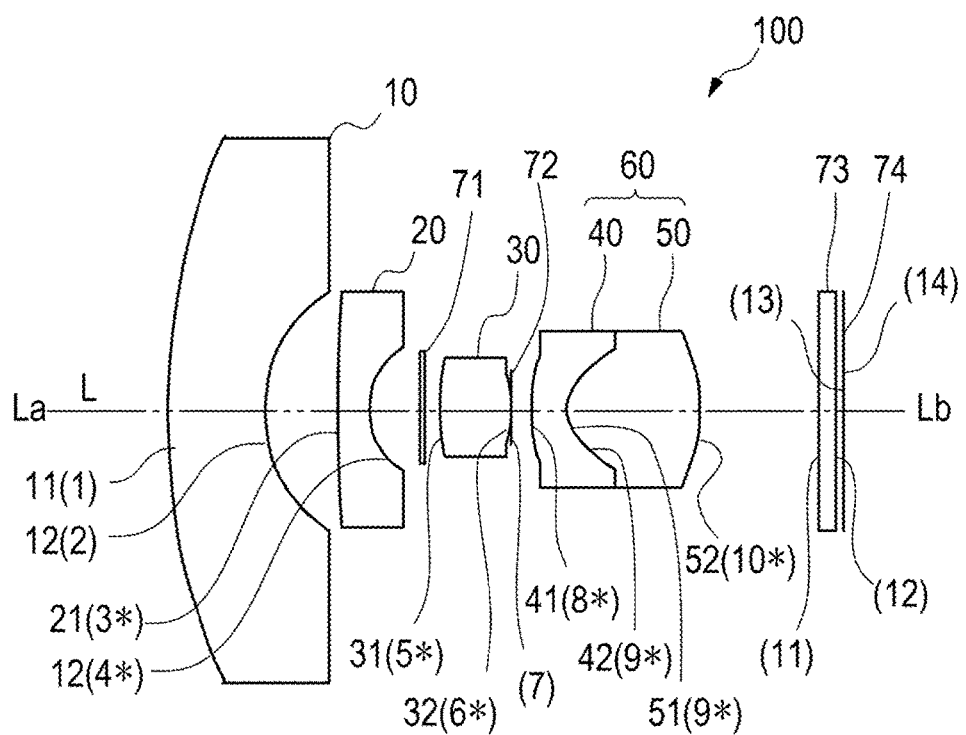
FIG. 6 is an explanatory diagram of a wide-angle lens according to a second embodiment.
Figure 7:
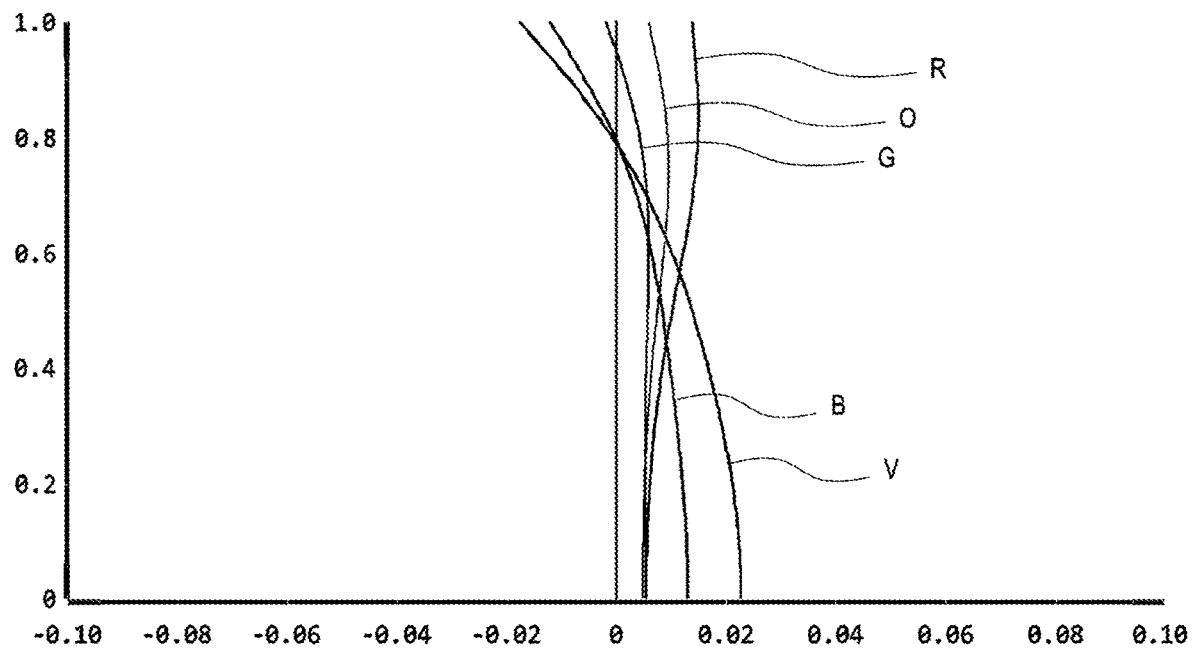
FIG. 7 is a graph explaining a spherical aberration of the wide-angle lens illustrated in FIG. 6.
Figure 8:
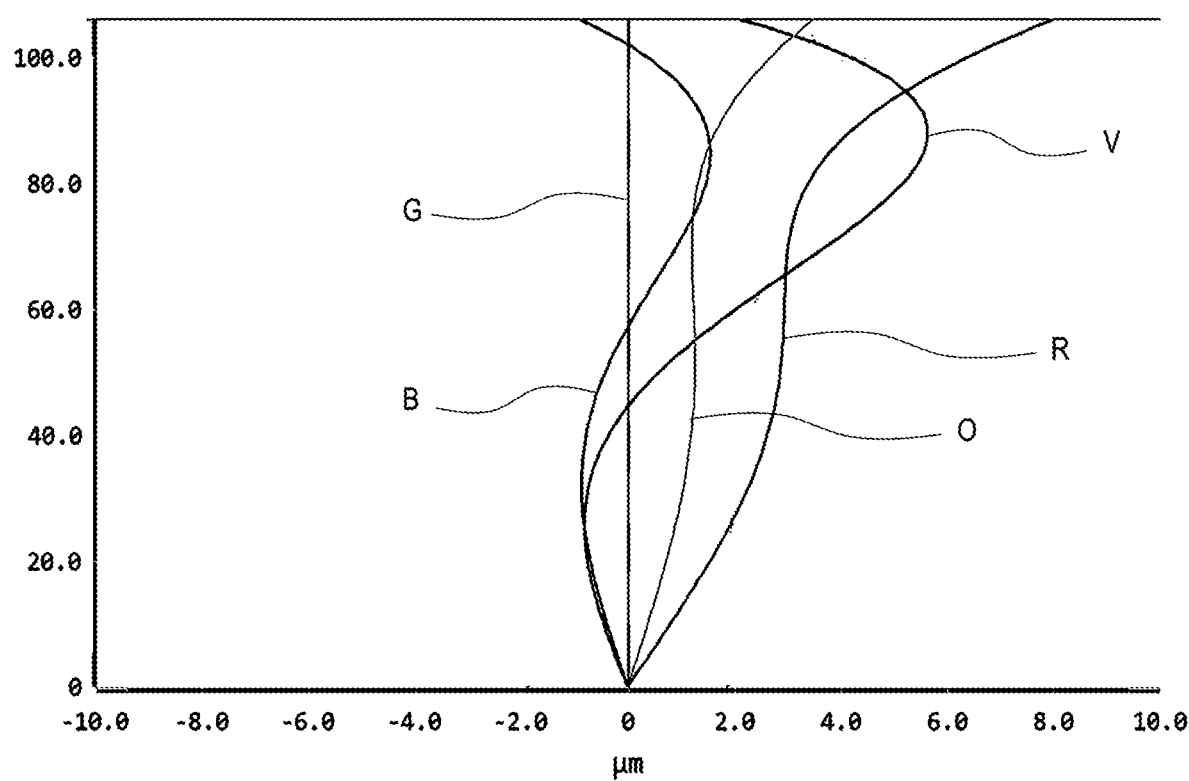
FIG. 8 is a graph explaining a magnification chromatic aberration of the wide-angle lens illustrated in FIG. 6.
Figure 9:
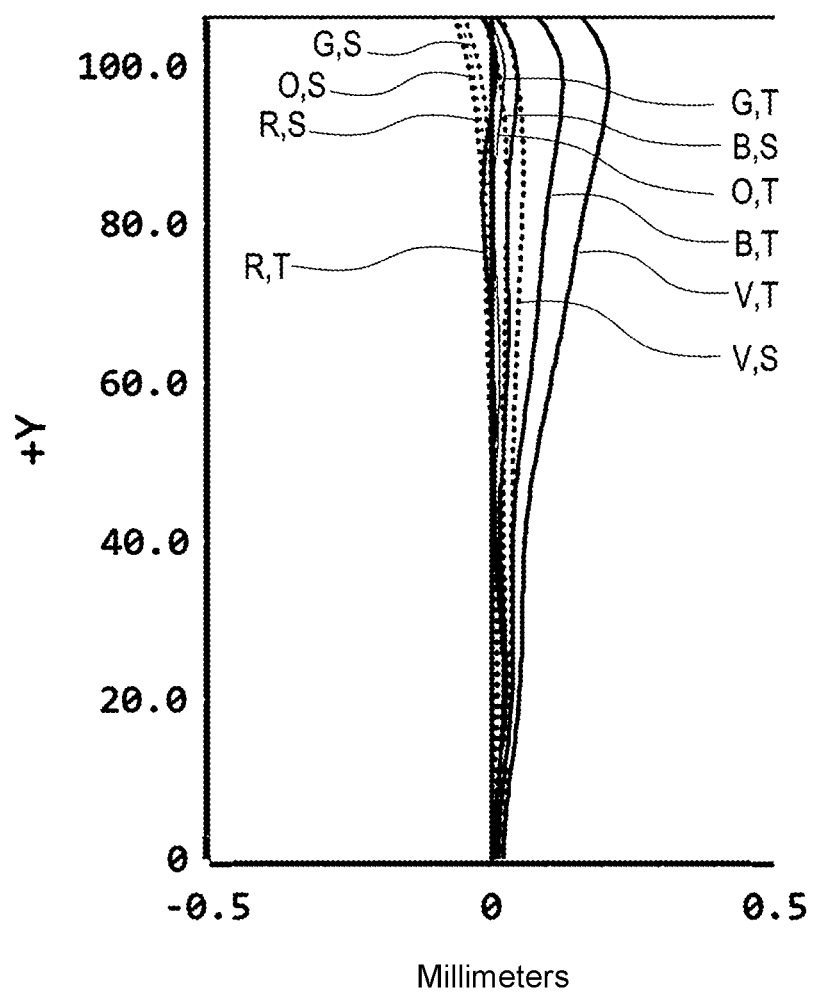
FIG. 9 is a graph explaining an astigmatism of the wide-angle lens illustrated in FIG. 6.
Figure 10:
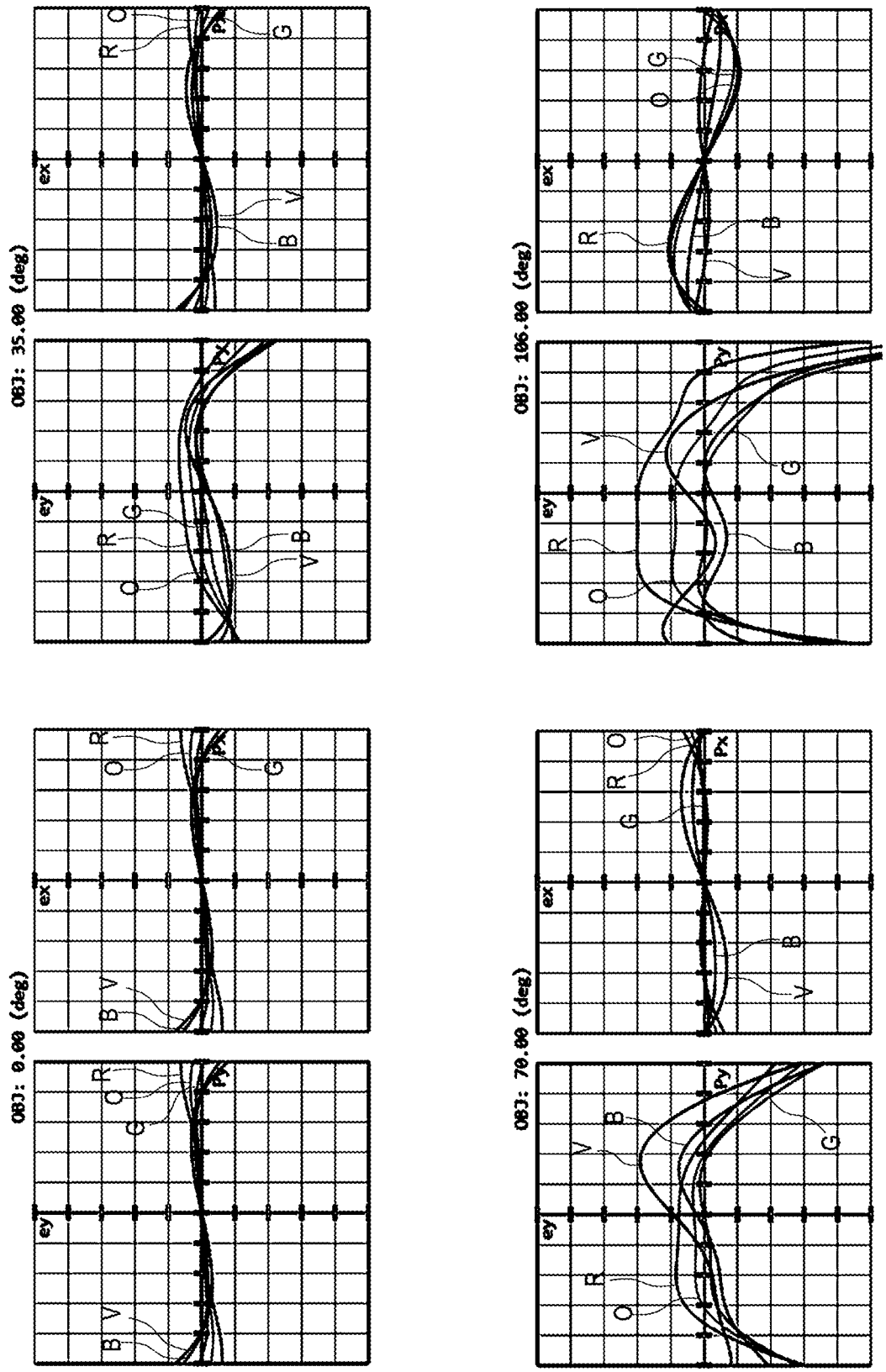
FIG. 10 is a graph explaining a lateral aberration of the wide-angle lens illustrated in FIG. 6.

FIG. 6 is an explanatory diagram of the wide-angle lens 100 according to a second embodiment of the present invention. FIG. 7 is a graph explaining a spherical aberration of the wide-angle lens 100 illustrated in FIG. 6. FIG. 8 is a graph explaining a magnification chromatic aberration of the wide-angle lens 100 illustrated in FIG. 6, where the magnification chromatic aberration at a maximum angle of view is illustrated. FIG. 9 is a graph explaining an astigmatism of the wide-angle lens 100 illustrated in FIG. 6. FIG. 10 is a graph explaining a lateral aberration of the wide-angle lens 100 illustrated in FIG. 6. It is noted that since the basic configuration of the present embodiment is similar to that of the first embodiment, corresponding portions are denoted by the same reference numerals, and descriptions thereof are omitted.

As illustrated in FIG. 6, similarly to the first embodiment, the wide-angle lens 100 of the present embodiment also includes a first lens 10, a second lens 20, a light shielding sheet 71, a third lens 30, a diaphragm 72, a fourth lens 40, and a fifth lens 50, arranged in order from an object side La to an image side Lb, and a flat plate-shaped infrared filter 73, a translucent cover 74, and an image pickup element (not illustrated) are arranged in order on the image side Lb with respect to the fifth lens 50. In the present embodiment, a projection method of the wide-angle lens 100 is a stereographic projection method where a peripheral image is larger than a central image.

A configuration and the like of each lens of the wide-angle lens 100 of the present embodiment are as shown in Table 4, and Table 5 shows aspheric coefficients A4, A6, A8, A10, A12, A14, and A16 obtained when a shape of an aspheric lens employed for the wide-angle lens 100 is represented by the same expression (Math. 1) as that in the first embodiment.

(first surface (1)) of the first lens 10 on the object side La is a convex curved surface, and the first lens 10 is a negative meniscus lens. The first lens 10 is a glass lens, and the lens surface 11 (first surface (1)) and the lens surface 12 (second surface (2)) are spherical. For the first lens 10, a lens material having a refractive index of 1.808 and an Abbe number of 46.26 is employed, and the focal length is −4.294 mm.

The second lens 20 is a negative lens whose lens surface 21 (third surface (3)) of the second lens 20 on the object side La is a convex curved surface and whose lens surface 22 (fourth surface (4)) on the image side Lb is a concave curved surface. The second lens 20 is a plastic lens made of acrylic resins, polycarbonates, polyolefins or the like, and both the lens surface 21 (third surface (3)) and the lens surface 22 (fourth surface (4)) are aspherical. For the second lens 20, a

TABLE 4

| | Effective Focal Length(f0) | | | 1.360 | | mm | | | |
|---|---|---|---|---|---|---|---|---|---|
| | Total Track | | | 12.451 | | mm | | | |
| | Image Space F/# | | | 2.8 | | | | | |
| | Max. Field of Angle | | | 212 | | deg | | | |
| | Horizontal Field of Angle | | | 151.750 | | deg | | | |

| | Surf | Radius | Thickness | Nd | ν d | Semi-Diameter | Sag | f | fd1 | fd2 |
|---|---|---|---|---|---|---|---|---|---|---|
| 1 | 1 | 13.500 | 1.760 | 1.808 | 46.26 | 5.085 | 0.242 | −4.294 | −1.402 | 4.493 |
| | 2 | 2.600 | 1.378 | | | 2.195 | 0.243 | | | |
| 2 | 3* | 23.378 | 0.600 | 1.546 | 56.19 | 2.195 | 0.011 | −2.830 | | |
| | 4* | 1.437 | 1.333 | | | 1.120 | 0.112 | | | |
| 3 | 5* | 8.134 | 1.270 | 1.641 | 23.90 | 0.926 | 0.014 | 2.932 | 2.584 | |
| | 6* | −2.296 | −0.085 | | | 0.665 | −0.024 | | | |
| | 7(stop) | Infinity | 0.529 | | | | | | | |
| 4, 5 | 8* | 3.888 | 0.600 | 1.641 | 23.90 | 0.967 | 0.031 | −1.363 | | 4.338 |
| | 9* | 0.670 | 2.422 | 1.546 | 56.19 | 1.157 | 0.241 | 1.328 | | |
| | 10* | −2.446 | 0.100 | | | 1.462 | −0.104 | | | |
| | 11 | Infinity | 2.174 | | | | | | | |
| | 12 | Infinity | 0.300 | | | | | | | |
| | 13 | Infinity | 0.070 | | | | | | | |
| | 14 | Infinity | 0.000 | | | | | | | |

TABLE 5

| Surf | c (1/Radius) | K | A4 | A6 | A8 |
|---|---|---|---|---|---|
| 3 | 4.27749E−02 | 0.00000E+00 | −1.76594E−02 | 7.45622E−03 | −1.05417E−03 |
| 4 | 6.95959E−01 | 3.80986E−01 | −4.03648E−02 | 2.53755E−03 | 2.36667E−02 |
| 5 | 1.22946E−01 | 0.00000E+00 | 4.69504E−03 | 1.17326E−02 | 7.87733E−03 |
| 6 | −4.35518E−01 | 0.00000E+00 | 3.79454E−02 | 3.34482E−05 | −3.84885E−03 |
| 8 | 2.57184E−01 | 0.00000E+00 | 1.20852E−02 | −5.25608E−03 | 5.43193E−03 |
| 9 | 1.49145E+00 | −1.23308E+00 | 1.64517E−02 | −1.77040E−02 | 2.18676E−02 |
| 10 | −4.08776E−01 | −1.05471E+01 | −5.81517E−02 | 3.79200E−02 | −1.45032E−02 |

| | Surf | A10 | A12 | A14 | A16 |
|---|---|---|---|---|---|
| | 3 | 3.70888E−05 | 0.00000E+00 | 0.00000E+00 | 0.00000E+00 |
| | 4 | −2.34621E−02 | 1.26302E−02 | 0.00000E+00 | 0.00000E+00 |
| | 5 | 2.12052E−03 | 0.00000E+00 | 0.00000E+00 | 0.00000E+00 |
| | 6 | 1.12524E−02 | 0.00000E+00 | 0.00000E+00 | 0.00000E+00 |
| | 8 | −1.23471E−03 | −2.24827E−04 | 0.00000E+00 | 0.00000E+00 |
| | 9 | −1.58638E−03 | −2.21691E−03 | 0.00000E+00 | 0.00000E+00 |
| | 10 | 3.61136E−03 | −2.36223E−04 | 0.00000E+00 | 0.00000E+00 |

As shown in Table 4, in the wide-angle lens 100 of the present embodiment, a focal length f0 of the entire lens system is 1.360 mm, an object-to-image distance is 12.451 mm, an F value of the entire lens system is 2.8, a maximum field angle is 212 deg, and a horizontal field angle is 151.750 deg.

The first lens 10 is a negative lens whose lens surface 12 (second surface (2)) on the image side Lb is a concave curved surface. In the present embodiment, a lens surface 11 lens material having a refractive index of 1.546 and an Abbe number of 56.19 is employed, and the focal length f is −2.830 mm.

The third lens 30 is a positive lens whose lens surface 32 (sixth surface (6)) on the image side Lb is a convex curved surface. In the present embodiment, a lens surface 31 (fifth surface (5)) of the third lens 30 on the object side La is a convex curved surface, and the third lens 30 is a biconvex lens. The third lens 30 is a plastic lens made of acrylic resins, polycarbonates, polyolefins or the like, and the lens surface 31 (fifth surface (5)) and the lens surface 32 (sixth surface (6)) are aspherical. For the third lens 30, a lens material having a refractive index of 1.641 and an Abbe number of 23.90 is employed, and the focal length is 2.932 mm.

The fourth lens 40 is a negative lens whose lens surface 42 on the image side Lb is a concave curved surface. In the present embodiment, the lens surface 41 (eighth surface (8)) of the fourth lens 40 on the object side La is a convex curved surface, and the fourth lens 40 is a meniscus lens. The fourth lens 40 is a plastic lens made of acrylic resins, polycarbonates, polyolefins or the like, and the lens surface 41 (eighth surface (8)) and the lens surface 42 (ninth surface (9)) are aspherical. For the fourth lens 40, a lens material having a refractive index of 1.641 and an Abbe number of 23.90 is employed.

The fifth lens 50 is a biconvex lens in which both a lens surface 51 (ninth surface (9)) on the object side La and a lens surface 52 (tenth surface (10)) on the image side Lb are convex curved surfaces. The fifth lens 50 is a plastic lens made of acrylic resins, polycarbonates, polyolefins or the like, and the lens surface 51 (ninth surface (9)) and the lens surface 52 (tenth surface (10)) are aspherical. For the fifth lens 50, a lens material having a refractive index of 1.546 and an Abbe number of 56.19 is employed.

Here, the lens surface 42 of the fourth lens 40 on the image side Lb and the lens surface 51 of the fifth lens 50 on the object side La are formed in the same shape, and the fourth lens 40 and the fifth lens 50 configure a cemented lens 60 in which the lens surface 42 of the fourth lens 40 on the image side Lb and the lens surface 51 of the fifth lens 50 on the object side La are cemented with resin. Therefore, a cemented surface between the lens surface 42 of the fourth lens 40 on the image side Lb and the lens surface 51 of the fifth lens 50 on the object side La is the ninth surface (9). The focal length (composite focal length f34) of the cemented lens 60 is 4.338 mm. In the present embodiment, a resin material is a UV curing adhesive. Preferably, the adhesive is a material having elasticity even after the curing.

A surface of the infrared filter 73 on the object side La configures an eleventh surface (11), and a surface on the image side Lb configures a twelfth surface (12). A surface of the cover 74 on the object side La configures a thirteenth surface (13). A surface of the cover 74 on the image side Lb configures a fourteenth surface (14), which corresponds to an image pickup surface of the image pickup element.

As illustrated in FIG. 7 to FIG. 10, in the wide-angle lens 100 of the present embodiment, the spherical aberration, the magnification chromatic aberration, the astigmatism, and the lateral aberration are corrected to an appropriate level.

In the wide-angle lens 100 of the present embodiment, respective values related to the conditional expressions (1) to (6) described in the first embodiment are shown in Table 3, the wide-angle lens 100 of the present embodiment satisfies the conditional expressions (1) to (6). Therefore, the wide-angle lens 100 of the present embodiment also provides a similar effect to that in the first embodiment.

Specifically, the refractive index n1 of the first lens 10 is 1.808. As in the present embodiment, the refractive index n1 of the first lens 10 exceeds 1.7, and the conditional expression (1) is satisfied. Further, the sag quantity Sag21 of the lens surface 21 of the second lens 20 on the object side La is 0.011, the diameter D21/2 of the lens surface 21 of the second lens 20 on the object side La is 2.195, and |Sag21/(D21/2)| is 0.005, and the conditional expression (2) is satisfied. Sag12 of the lens surface 12 of the first lens 10 on the image side Lb is 0.243 and when the diameter of the lens surface 12 of the first lens 10 on the image side Lb is D12, D12/2 is 2.195, and Sag12/(D12/2) is 0.110, where the conditional expression (3) is satisfied. The composite focal length f12 of the first lens 10 and the second lens 20 is −1.402, the composite focal length f0 of the entire lens system is 1.360, and f12/f0 is −1.030, wherein the conditional expression (4) is satisfied. The composite focal length f12 of the first lens 10 and the second lens 20 is −1.402, the composite focal length f345 of the third lens 30, the fourth lens 40, and the fifth lens 50 is 2.584, and |<f12/f345| is 0.542, where the conditional expression (5) is satisfied. The composite focal length f123 of the first lens 10, the second lens 20, and the third lens 30 is 4.493, the composite focal length f45 of the fourth lens 40 and the fifth lens 50 is 4.338, and f123/f45 is 1.04, where the conditional expression (6) is satisfied.

Third Embodiment

Figure 11:
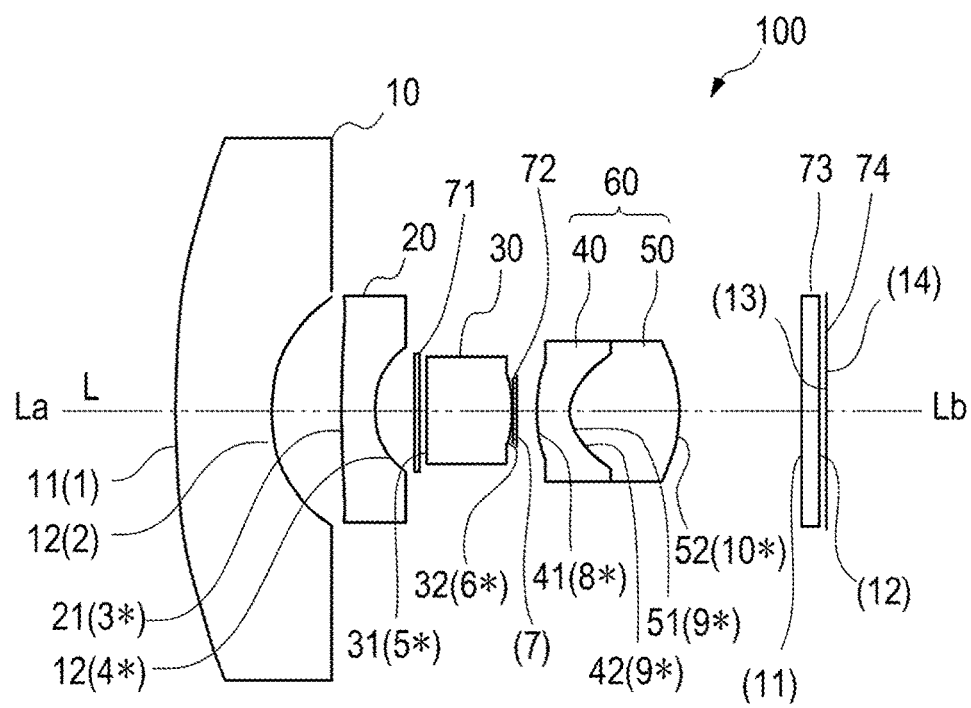
FIG. 11 is an explanatory diagram of a wide-angle lens according to the third embodiment.
Figure 12:
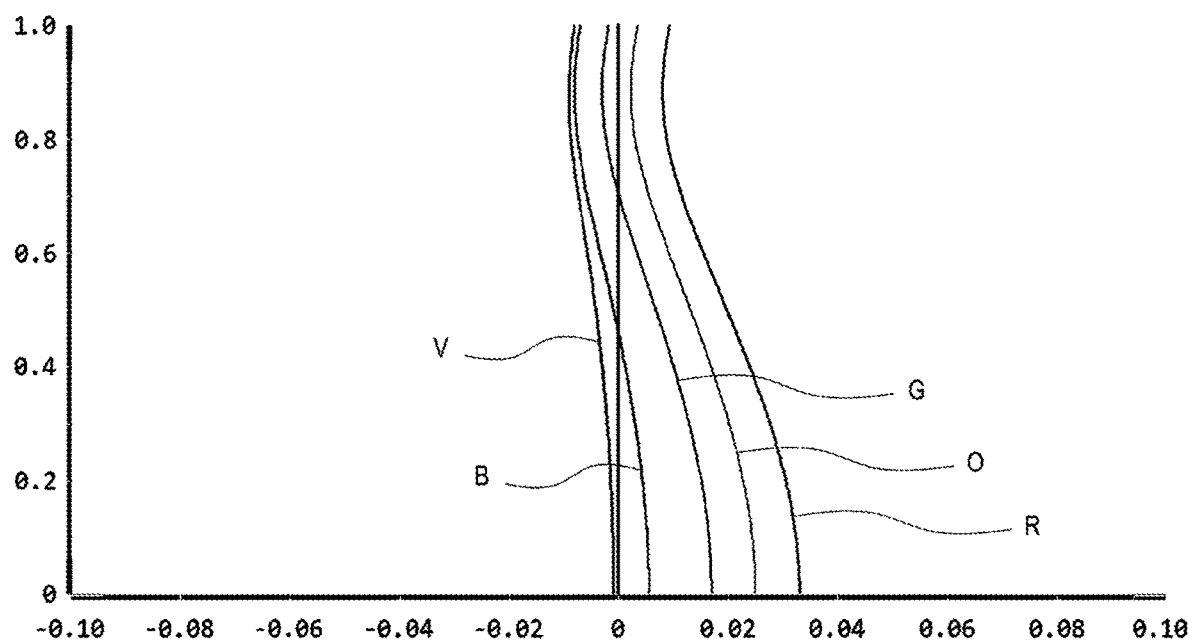
FIG. 12 is a graph explaining a spherical aberration of the wide-angle lens illustrated in FIG. 11.
Figure 13:
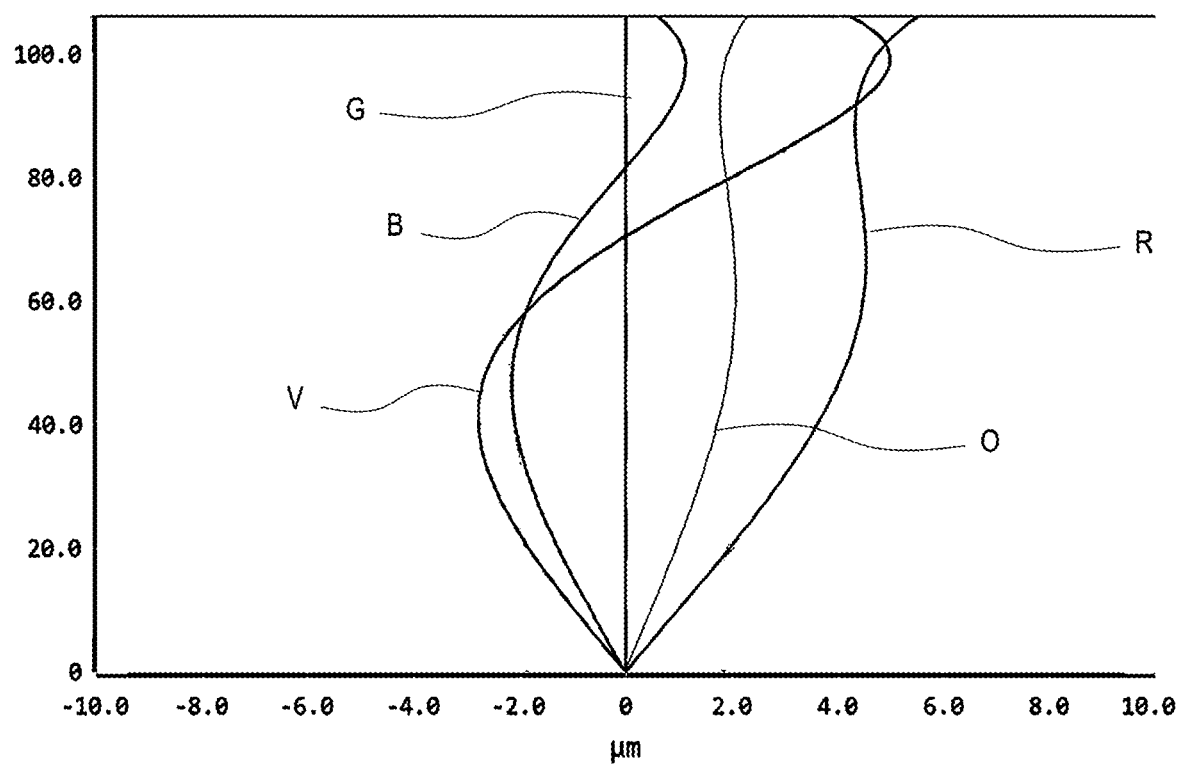
FIG. 13 is a graph explaining a magnification chromatic aberration of the wide-angle lens illustrated in FIG. 11.
Figure 14:
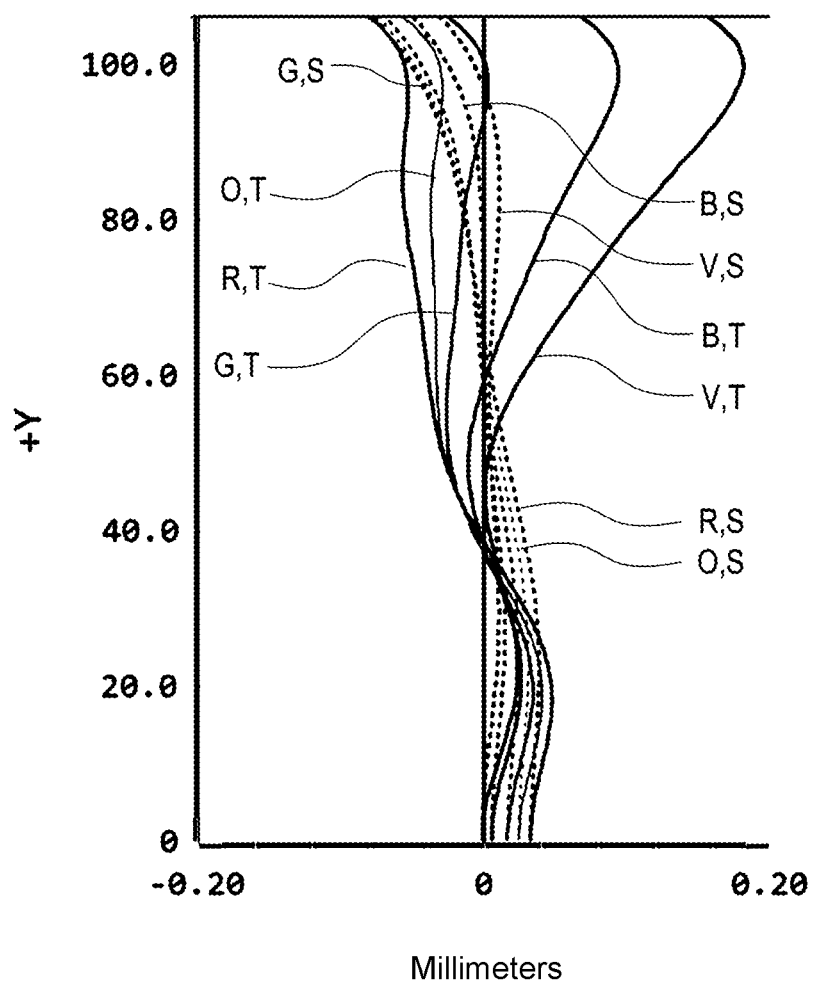
FIG. 14 is a graph explaining an astigmatism of the wide-angle lens illustrated in FIG. 11.
Figure 15:
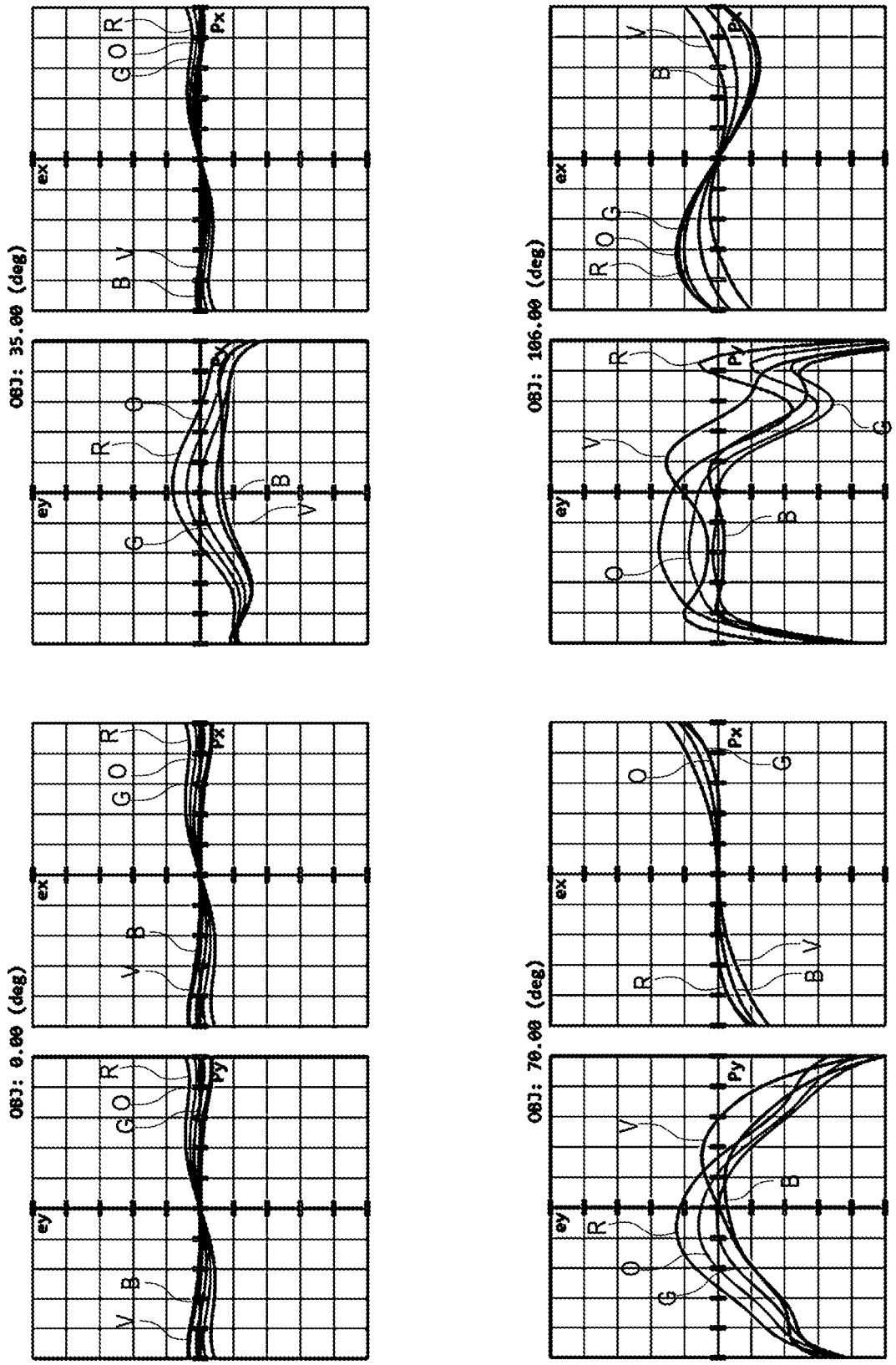
FIG. 15 is a graph explaining a lateral aberration of the wide-angle lens illustrated in FIG. 11.

FIG. 11 is an explanatory diagram of the wide-angle lens 100 according to a third embodiment of the present invention. FIG. 12 is a graph explaining a spherical aberration of the wide-angle lens 100 illustrated in FIG. 10. FIG. 13 is a graph explaining a magnification chromatic aberration of the wide-angle lens 100 illustrated in FIG. 10, where the magnification chromatic aberration at a maximum angle of view is illustrated. FIG. 14 is a graph explaining an astigmatism of the wide-angle lens 100 illustrated in FIG. 11. FIG. 15 is a graph explaining a lateral aberration of the wide-angle lens 100 illustrated in FIG. 11. It is noted that since the basic configuration of the present embodiment is similar to that of the first and second embodiments, corresponding portions are denoted by the same reference numerals, and descriptions thereof are omitted.

As illustrated in FIG. 11, similarly to the first and second embodiments, the wide-angle lens 100 of the present embodiment also includes a first lens 10, a second lens 20, a light shielding sheet 71, a third lens 30, a diaphragm 72, a fourth lens 40, and a fifth lens 50, arranged in order from an object side La to an image side Lb, and a flat plate-shaped infrared filter 73, a translucent cover 74, and an image pickup element (not illustrated) are arranged in order on the image side Lb with respect to the fifth lens 50. In the present embodiment, a projection method of the wide-angle lens 100 is a stereographic projection method where a peripheral image is larger than a central image.

A configuration and the like of each lens of the wide-angle lens 100 of the present embodiment are as shown in Table 6, and Table 7 shows aspheric coefficients A4, A6, A8, A10, A12, A14, and A16 obtained when a shape of an aspheric lens employed for the wide-angle lens 100 is represented by the same expression (Math. 1) as that in the first embodiment.

TABLE 6

| Effective Focal Length(f0) | 1.326 | mm |
|---|---|---|
| Total Track | 12.487 | mm |
| Image Space F/# | 2.8 | |
| Max. Field of Angle | 216 | deg |

TABLE 6-continued

| | | Horizontal Field of Angle | | | | 151.780 | | deg | | |
|---|---|---|---|---|---|---|---|---|---|---|
| | Surf | Radius | Thickness | Nd | v d | Semi-Diameter | Sag | f | fd1 | fd2 |
| 1 | 1 | 13.500 | 1.900 | 1.808 | 46.26 | 5.282 | 0.261 | −4.294 | −1.470 | 4.072 |
| | 2 | 2.587 | 1.361 | | | 2.195 | 0.244 | | | |
| 2 | 3* | 13.857 | 0.600 | 1.546 | 56.19 | 2.195 | 0.031 | −3.033 | | |
| | 4* | 1.457 | 1.002 | | | 1.189 | 0.124 | | | |
| 3 | 5* | −202.152 | 1.681 | 1.641 | 23.90 | 1.050 | −0.001 | 2.925 | 2.461 | |
| | 6* | −1.864 | 0.008 | | | 0.748 | −0.036 | | | |
| | 7(stop) | Infinity | 0.483 | | | | | | | |
| 4, 5 | 8* | 5.594 | 0.600 | 1.641 | 23.90 | 0.938 | 0.024 | −1.650 | | 4.305 |
| | 9* | 0.853 | 2.090 | 1.546 | 56.19 | 1.130 | 0.201 | 1.487 | | |
| | 10* | −2.306 | 0.100 | | | 1.382 | −0.099 | | | |
| | 11 | Infinity | 2.293 | | | | | | | |
| | 12 | Infinity | 0.300 | | | | | | | |
| | 13 | Infinity | 0.070 | | | | | | | |
| | 14 | Infinity | 0.000 | | | | | | | |

TABLE 7

| Surf | c (1/Radius) | K | A4 | A6 | A8 |
|---|---|---|---|---|---|
| 3 | 7.21678E−02 | 0.00000E+00 | −8.81178E−03 | −5.68253E−04 | 1.10624E−03 |
| 4 | 6.86234E−01 | 1.08161E−01 | −2.36647E−02 | −1.28714E−02 | 9.66499E−03 |
| 5 | −4.94678E−03 | 0.00000E+00 | −7.44718E−03 | −8.00971E−03 | 1.86945E−02 |
| 6 | −5.36433E−01 | 0.00000E+00 | 8.40765E−02 | −5.65177E−02 | 6.67831E−03 |
| 8 | 1.78748E−01 | 0.00000E+00 | 1.10129E−01 | −1.27719E−01 | 8.01984E−02 |
| 9 | 1.17291E+00 | −6.85285E−01 | 1.44715E−01 | −2.75643E−01 | 4.86907E−02 |
| 10 | −4.33571E−01 | −1.06995E+01 | −7.11968E−02 | 4.94837E−02 | −1.68098E−02 |

| Surf | A10 | A12 | A14 | A16 |
|---|---|---|---|---|
| 3 | −2.96783E−04 | 2.58142E−05 | 0.00000E+00 | 0.00000E+00 |
| 4 | −1.16147E−03 | −4.50811E−04 | 0.00000E+00 | 0.00000E+00 |
| 5 | −1.11993E−02 | 2.26944E−03 | 0.00000E+00 | 0.00000E+00 |
| 6 | 5.96563E−02 | −4.62247E−02 | 0.00000E+00 | 0.00000E+00 |
| 8 | −6.24081E−03 | −1.06214E−02 | 5.31508E−04 | 0.00000E+00 |
| 9 | 8.70966E−02 | −4.86270E−02 | 3.33260E−03 | 0.00000E+00 |
| 10 | 2.54013E−03 | 6.28675E−04 | −9.98019E−05 | 0.00000E+00 |

As shown in Table 6, in the wide-angle lens 100 of the present embodiment, a focal length f0 of the entire lens system is 1.326 mm, an object-to-image distance is 12.487 mm, an F value of the entire lens system is 2.8, a maximum field angle is 216 deg, and a horizontal field angle is 151.780 deg.

The first lens 10 is a negative lens whose lens surface 12 (second surface (2)) on the image side Lb is a concave curved surface. In the present embodiment, a lens surface 11 (first surface (1)) of the first lens 10 on the object side La is a convex curved surface, and the first lens 10 is a negative meniscus lens. The first lens 10 is a glass lens, and the lens surface 11 (first surface (1)) and the lens surface 12 (second surface (2)) are spherical. For the first lens 10, a lens material having a refractive index of 1.808 and an Abbe number of 46.26 is employed, and the focal length is −4.294 mm.

The second lens 20 is a negative lens whose lens surface 21 (third surface (3)) of the second lens 20 on the object side La is a convex curved surface and whose lens surface 22 (fourth surface (4)) on the image side Lb is a concave curved surface. The second lens 20 is a plastic lens made of acrylic resins, polycarbonates, polyolefins or the like, and both the lens surface 21 (third surface (3)) and the lens surface 22 (fourth surface (4)) are aspherical. For the second lens 20, a lens material having a refractive index of 1.546 and an Abbe number of 56.19 is employed, and the focal length f is −3.033 mm.

The third lens 30 is a positive lens whose lens surface 32 (sixth surface (6)) on the image side Lb is a convex curved surface. In the present embodiment, the lens surface 31 (fifth surface (5)) of the third lens 30 on the object side La is a plane surface, and the third lens 30 is a plano-convex lens. The third lens 30 is a plastic lens made of acrylic resins, polycarbonates, polyolefins or the like, and the lens surface 31 (fifth surface (5)) and the lens surface 32 (sixth surface (6)) are aspherical. For the third lens 30, a lens material having a refractive index of 1.641 and an Abbe number of 23.90 is employed, and the focal length is 2.925 mm.

The fourth lens 40 is a negative lens whose lens surface 42 on the image side Lb is a concave curved surface. In the present embodiment, the lens surface 41 (eighth surface (8)) of the fourth lens 40 on the object side La is a convex curved surface, and the fourth lens 40 is a meniscus lens. The fourth lens 40 is a plastic lens made of acrylic resins, polycarbonates, polyolefins or the like, and the lens surface 41 (eighth surface (8)) and the lens surface 42 (ninth surface (9)) are aspherical. For the fourth lens 40, a lens material having a refractive index of 1.641 and an Abbe number of 23.90 is employed.

The fifth lens 50 is a biconvex lens in which both a lens surface 51 (ninth surface (9)) on the object side La and a lens surface 52 (tenth surface (10)) on the image side Lb are convex curved surfaces. The fifth lens 50 is a plastic lens made of acrylic resins, polycarbonates, polyolefins or the like, and the lens surface 51 (ninth surface (9)) and the lens surface 52 (tenth surface (10)) are aspherical. For the fifth lens 50, a lens material having a refractive index of 1.546 and an Abbe number of 56.19 is employed.

Here, the lens surface 42 of the fourth lens 40 on the image side Lb and the lens surface 51 of the fifth lens 50 on the object side La are formed in the same shape, and the fourth lens 40 and the fifth lens 50 configure a cemented lens 60 in which the lens surface 42 of the fourth lens 40 on the image side Lb and the lens surface 51 of the fifth lens 50 on the object side La are cemented with resin. Therefore, a cemented surface between the lens surface 42 of the fourth lens 40 on the image side Lb and the lens surface 51 of the fifth lens 50 on the object side La is the ninth surface (9). The focal length (composite focal length f34) of the cemented lens 60 is 4.305 mm. In the present embodiment, a resin material is a UV curing adhesive. Preferably, the adhesive is a material having elasticity even after the curing.

A surface of the infrared filter 73 on the object side La configures an eleventh surface (11), and a surface on the image side Lb configures a twelfth surface (12). A surface of the cover 74 on the object side La configures a thirteenth surface (13). A surface of the cover 74 on the image side Lb configures a fourteenth surface (14), which corresponds to an image pickup surface of the image pickup element.

As illustrated in FIG. 7 to FIG. 10, in the wide-angle lens 100 of the present embodiment, the spherical aberration, the magnification chromatic aberration, the astigmatism, and the lateral aberration are corrected to an appropriate level.

In the wide-angle lens 100 of the present embodiment, respective values related to the conditional expressions (1) to (6) described in the first embodiment are shown in Table 3, the wide-angle lens 100 of the present embodiment satisfies the conditional expressions (1) to (6). Therefore, the wide-angle lens 100 of the present embodiment also provides a similar effect to that in the first embodiment.

Specifically, the refractive index n1 of the first lens 10 is 1.808. As in the present embodiment, the refractive index n1 of the first lens 10 exceeds 1.7, and the conditional expression (1) is satisfied. Further, the sag quantity Sag21 of the lens surface 21 of the second lens 20 on the object side La is 0.031, the diameter D21/2 of the lens surface 21 of the second lens 20 on the object side La is 2.195, and |Sag21/(D21/2)| is 0.014, where the conditional expression (2) is satisfied. In addition, Sag12 of the lens surface 12 of the first lens 10 on the image side Lb is 0.244 and when the diameter of the lens surface 12 of the first lens 10 on the image side Lb is D12, D12/2 is 2.195, and Sag12/(D12/2) is 0.111, where the conditional expression (3) is satisfied. Further, the composite focal length f12 of the first lens 10 and the second lens 20 is −1.470, the composite focal length f0 of the entire lens system is 1.326, and f12/f0 is −1.109, wherein the conditional expression (4) is satisfied. Moreover, the composite focal length f12 of the first lens 10 and the second lens 20 is −1.470, the composite focal length f345 of the third lens 30, the fourth lens 40, and the fifth lens 50 is 2.461, and |<f12/f345| is 0.597, where the conditional expression (5) is satisfied. Still further, the composite focal length f123 of the first lens 10, the second lens 20, and the third lens 30 is 4.072, the composite focal length f45 of the fourth lens 40 and the fifth lens 50 is 4.305, and f123/f45 is 0.946, where the conditional expression (6) is satisfied.

In addition, it is more preferable that the composite focal lengths f123 and f45 satisfy the following conditional expression (6-2):

0.1<*f*123/*f*45<1    Condition expression (6-2)

Even in this case, since f123/f45 is 0.946, the value of f123/f45 is less than 1. Accordingly, it is possible to further suppress an excessive increase in the positive power, so that the coma aberration and the astigmatism can be appropriately corrected.

What is claimed is:

1. A wide-angle lens comprising: a first lens, a second lens, a third lens, a diaphragm, a fourth lens, and a fifth lens arranged in order from an object side, wherein
the first lens is a negative meniscus lens whose lens surface on an image side is a concave curved surface,
the second lens is a negative lens whose lens surface on the image side is a concave curved surface,
the third lens is a positive lens whose lens surface on the image side is a convex curved surface,
the fourth lens is a negative lens whose lens surface on the image side is a concave curved surface,
the fifth lens is a biconvex lens whose lens surface on the image side and lens surface on the object side are convex curved surfaces,
the second lens, the third lens, the fourth lens, and the fifth lens are plastic lenses,
a refractive index n1 of the first lens satisfies the following conditional expression (1), where n1 denotes a refractive index Nd of the first lens 1.7<*n*1    Conditional expression (1), wherein when the sag quantity of the lens surface of the first lens on the image side is Sag12 (mm) and the diameter of the lens surface of the first lens on the image side is D12 (mm), the sag quantity Sag12 and the diameter D12 satisfy the following conditional expression (3)

0.050<*Sag*12/(*D*12/2)<1.733    Conditional expression (3).

2. The wide-angle lens according to claim 1, wherein when the sag quantity of the lens surface of the second lens on the object side is Sag 21 (mm) and a diameter of the lens surface of the second lens on the object side is D21 (mm), the sag quantity Sag 21 and the diameter D21 satisfy the following conditional expression (2).

0<|*Sag*21/(*D*21/2)|<0.125    Conditional expression (2).

3. The wide-angle lens according to claim 2, wherein when a composite focal length of the first lens and the second lens is f12 (mm) and a composite focal length of the entire lens system is f0 (mm), the following conditional expression (4) is satisfied.

−2.5<*f*12/*f*0<−0.5    Conditional expression (4).

4. The wide-angle lens according to claim 3, wherein when the composite focal length of the first lens and the second lens is f12 (mm) and the composite focal length of the third lens, the fourth lens, and the fifth lens is f345 (mm), the composite focal lengths f12 and f345 satisfy the following conditional expression (5).

0.1<|*f*12/*f*345|<1    Conditional expression (5).

5. The wide-angle lens according to claim 4, wherein when the composite focal length of the first lens, the second lens, and the third lens is f123 (mm) and the composite focal length of the fourth lens and the fifth lens is f45 (mm), the composite focal lengths f123 and f45 satisfy the following conditional expression (6).

0.1<*f*123/*f*45<1.1    Conditional expression (6).

6. The wide-angle lens according to claim 1, wherein when a composite focal length of the first lens and the second lens is f12 (mm) and a composite focal length of the entire lens system is f0 (mm), the following conditional expression (4) is satisfied.

$$-2.5 < f12/f0 < -0.5 \quad \text{Conditional expression (4).}$$

7. The wide-angle lens according to claim 6, wherein when the composite focal length of the first lens and the second lens is f12 (mm) and the composite focal length of the third lens, the fourth lens, and the fifth lens is f345 (mm), the composite focal lengths f12 and f345 satisfy the following conditional expression (5).

$$0.1 < |f12/f345| < 1 \quad \text{Conditional expression (5).}$$

8. The wide-angle lens according to claim 7, wherein when the composite focal length of the first lens, the second lens, and the third lens is f123 (mm) and the composite focal length of the fourth lens and the fifth lens is f45 (mm), the composite focal lengths f123 and f45 satisfy the following conditional expression (6).

$$0.1 < f123/f45 < 1.1 \quad \text{Conditional expression (6).}$$

9. The wide-angle lens according to claim 1, wherein when the composite focal length of the first lens and the second lens is f12 (mm) and the composite focal length of the third lens, the fourth lens, and the fifth lens is f345 (mm), the composite focal lengths f12 and f345 satisfy the following conditional expression (5).

$$0.1 < |f12/f345| < 1 \quad \text{Conditional expression (5).}$$

10. The wide-angle lens according to claim 1, wherein when the composite focal length of the first lens, the second lens, and the third lens is f123 (mm) and the composite focal length of the fourth lens and the fifth lens is f45 (mm), the composite focal lengths f123 and f45 satisfy the following conditional expression (6).

$$0.1 < f123/f45 < 1.1 \quad \text{Conditional expression (6).}$$

11. The wide-angle lens according to claim 1, wherein the first lens is a glass lens.

* * * * *